(12) United States Patent
Schnur et al.

(10) Patent No.: US 6,666,985 B2
(45) Date of Patent: *Dec. 23, 2003

(54) POLYOL ESTER LUBRICANTS FOR HERMETICALLY SEALED REFRIGERATING COMPRESSORS

(75) Inventors: Nicholas E. Schnur, Cincinnati, OH (US); Eugene R. Zehler, West Chester, OH (US)

(73) Assignee: Cognis Corporation, Ambler, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/058,930

(22) Filed: Jan. 28, 2002

(65) Prior Publication Data

US 2002/0162989 A1 Nov. 7, 2002

Related U.S. Application Data

(63) Continuation of application No. 09/346,872, filed on Jul. 2, 1999, now abandoned, which is a continuation of application No. 08/537,167, filed on Sep. 29, 1995, now Pat. No. 6,221,272, which is a continuation of application No. 08/268,879, filed on Jun. 30, 1994, now abandoned, which is a continuation of application No. 08/027,628, filed on Mar. 10, 1993, now abandoned, which is a continuation-in-part of application No. PCT/US92/04438, filed on Jun. 3, 1992.

(51) Int. Cl.$^7$ ................................................. C09K 5/04
(52) U.S. Cl. ........................................... 252/68; 252/67
(58) Field of Search ..................................... 252/68, 67

(56) References Cited

U.S. PATENT DOCUMENTS

| RE19,265 E | 8/1934 | Midgley, Jr. |
| 2,035,541 A | 3/1936 | Fleischer |
| 2,040,902 A | 5/1936 | Zellhoefer |
| 2,084,950 A | 6/1937 | Downing |
| 2,187,388 A | 1/1940 | Williams |

(List continued on next page.)

FOREIGN PATENT DOCUMENTS

| AU | 252876 | 12/1960 |
| DE | 17 68 765 | 2/1972 |
| DE | 133 966 | 1/1979 |
| DE | 29 43 446 | 5/1980 |
| DE | 41 05 956 A1 | 8/1992 |

(List continued on next page.)

OTHER PUBLICATIONS

Neopentyl Polyol Ester Lubricants—Bulk Property Optimization; Niedzielski, Edmund; Ind. Eng. Chem., Prod. Res. Dev., vol. 15, No. 1, 1976.
Lubricants and Related Products, pp. 122–125, Klamann, Dieter, 1984.
Synthetic Ester Lubricants; Barnes, R.S. et al.; Lubrication Engineering; Aug. 1957.
New Type Lube Oil for HFC–134a Compressor System; Takeno, T. et al.; 1992.
Synthetic Lubricants (Ch. 10, Neopentyl Polyol Esters); Smith, Thomas; 1962; Midland, Michigan.
Complex Esters of 2,2–Dimethylhydracylic Acid; Lederle, Henry F.; New Haven, CT; Mar. 1969, pp. 70–71.
Grant & Hackh's Chemical Dictionary 5$^{th}$ Edition; 1987; pp. 11 and 284.
Hawley's Condensed Chemical Dictionary 11$^{th}$ Edition; 1987, p. 214.
H.H. Kruse and M. Schroeder, "Fundamentals of Lubrication in Refrigerating Systems and Heat Pumps," ASHRAE Transactions, vol. 90, Part 2B, KC–84–14, pp. 763–783, Kansas City, Missouri, 1984.
K. Sandvordenker, "Materials Compatibility of R134a in Refrigerant Systems," CFCS: Time of Transition, American Society of Heating, Refrigerating and Air–Conditioning Engineers, Inc., pp. 211–216, Jan. 1989.
Encyclopedia of Polymer Science and Engineering, vol. 4, 1986, p. 360.
C.M. Bosworth, "Predicting the Behavior of Oils in Refrigeration Systems", Refrigerating Engineering (Jun. 1952), pp. 617–621 and 654.
Glenn D. Short. "Synthetic Lubricants and Their Refrigeration Applications", Paper presented at the 44th Annual meeting in Atlanta, GA, May 1–14, 1989.
Diester Compressor Oils in Refrigeration, Fluid & Lubrication Ideas, Fall, 1979 pp. 25, 26.
Chemical Abstracts, vol. 110:215912z(1989).
Chemical Abstracts, vol 104:227376s (1986) and vol. 104:227379v (1986) and 227382r (1986).
H.O. Spauschus, "Evaluation of Lubricants for Refrigeration and Air–Conditioning Compressors", No. 2, pp. 784–798. ASHRAE Transactions 90(pt 2B) 1984.
K.S. Sanvordenker et al. "A Review of Synthetic Oils for Refrigeration Use", ASHRAE Symposium Bulletin NA–72–5, Nassau, Bahamas, pp. 14–19 (1972).
Mobil Chemical, "Ester Base Stock", Data Sheets for Mobil Esters P–41 and P–51 (date unknown).
Chemical Abstract, vol. 102, No. 2, p. 166, Abstract No. 102:9492u, Jan. 1985.
Certificates of Analyses numbered 1–35. The Certificates of Analyses pertain to "E32" with non relevant materials blanked out. The 35 Certificates of Analyses relate to activities and shipments of material more than one year prior to Jul. 12, 1990, the fling date of U.S. Ser. No. 551,969, which issued as U.S. Pat. No. 5,021,179 to Zehler et al. Each Certificate of Analyses bears a date more than one year prior to Jul. 12, 1990.

Primary Examiner—Margaret Einsmann
(74) Attorney, Agent, or Firm—John E. Drach

(57) ABSTRACT

A high quality lubricant for hermetically sealed domestic air conditioner and refrigerator compressors, especially those using chlorine free hydrofluorocarbon refrigerant working fluids, is provided by mixed esters of hindered polyols, most desirably pentaerythritol, with a mixture of carboxylic acids including at least some iso-pentanoic acid along with either or both of iso-nonanoic acid and dibasic acids such as adipic.

20 Claims, No Drawings

U.S. PATENT DOCUMENTS

| | | | |
|---|---|---|---|
| 2,520,612 A | 8/1950 | Roberts |
| 2,548,493 A | 4/1951 | Robey |
| 2,575,195 A | 11/1951 | Smith, Jr. |
| 2,575,196 A | 11/1951 | Smith, Jr. |
| 2,628,974 A | 2/1953 | Sanderson |
| 2,717,242 A | 9/1955 | Foehr |
| 2,807,155 A | 9/1957 | Williamitis |
| 2,852,470 A | 9/1958 | Henne |
| 2,926,139 A | 2/1960 | Mott |
| 2,958,706 A | 11/1960 | Hurwitz |
| 2,961,406 A | 11/1960 | McNeil, Jr. |
| 2,962,419 A | 11/1960 | Minich |
| 3,135,785 A | 6/1964 | Fritz |
| 3,189,629 A | 6/1965 | Huttenlocher |
| 3,194,791 A | 7/1965 | Wilson |
| 3,202,701 A | 8/1965 | Young |
| 3,282,971 A | 11/1966 | Metro |
| 3,309,318 A | 3/1967 | Aylesworth |
| 3,328,283 A | 6/1967 | Godar |
| 3,328,285 A | 6/1967 | Godar |
| 3,341,574 A | 9/1967 | Taylor |
| 3,441,600 A | 4/1969 | Chao |
| 3,523,084 A | 8/1970 | Chao |
| 3,560,387 A | 2/1971 | Schrift |
| 3,562,300 A | 2/1971 | Chao |
| 3,564,044 A | 2/1971 | Chao |
| 3,694,382 A | 9/1972 | Kleiman |
| 3,773,668 A | 11/1973 | Denis |
| 3,778,454 A | 12/1973 | Kleiman |
| 3,850,824 A | 11/1974 | Nebzydoski |
| 3,855,508 A | 12/1974 | Ross |
| 3,878,112 A | 4/1975 | Luck |
| 3,894,959 A | 7/1975 | Gardiner |
| 3,939,201 A | 2/1976 | Baskai |
| 4,045,376 A | 8/1977 | Rubin |
| 4,049,563 A | 9/1977 | Burrous |
| 4,053,491 A | 10/1977 | Koch |
| 4,113,642 A | 9/1978 | Koch |
| 4,144,183 A | 3/1979 | Koch |
| 4,155,861 A | 5/1979 | Schmitt |
| 4,159,255 A | 6/1979 | Gainer |
| 4,175,045 A | 11/1979 | Timony |
| 4,178,261 A | 12/1979 | Dhein |
| 4,199,461 A | 4/1980 | Olund |
| 4,212,816 A | 7/1980 | Hentschel |
| 4,234,497 A | 11/1980 | Honig |
| 4,243,540 A | 1/1981 | Mancini |
| 4,248,726 A | 2/1981 | Uchinuma |
| 4,263,159 A | 4/1981 | Berens |
| 4,267,064 A | 5/1981 | Sasaki |
| 4,292,187 A | 9/1981 | Hentschel |
| 4,302,343 A | 11/1981 | Carswell |
| 4,304,678 A | 12/1981 | Schick |
| 4,320,018 A | 3/1982 | Yaffe |
| 4,324,676 A | 4/1982 | Gilbert |
| 4,359,394 A | 11/1982 | Gainer |
| 4,371,577 A | 2/1983 | Sato |
| 4,428,854 A | 1/1984 | Enjo |
| 4,431,557 A | 2/1984 | Shimizu |
| 4,436,641 A | 3/1984 | Stelz |
| 4,440,660 A | 4/1984 | van Rijs |
| 4,454,052 A | 6/1984 | Shoji |
| 4,455,247 A | 6/1984 | Nakayama |
| 4,487,874 A | 12/1984 | Lindner |
| 4,530,772 A | 7/1985 | Timony |
| 4,557,850 A | 12/1985 | Ando et al. |
| 4,559,154 A | 12/1985 | Powell |
| 4,626,959 A | 12/1986 | Shedigian |
| 4,719,025 A | 1/1988 | Akiyama |
| 4,751,012 A | 6/1988 | Ward |
| 4,755,316 A | 7/1988 | Magid |
| 4,758,366 A | 7/1988 | Parekh |
| 4,780,229 A | 10/1988 | Mullin |
| 4,812,262 A | 3/1989 | Shinzawa |
| 4,826,633 A | 5/1989 | Carr |
| 4,851,144 A | 7/1989 | McGraw |
| 4,900,463 A | 2/1990 | Thomas |
| 4,916,914 A | 4/1990 | Short |
| 4,927,554 A | 5/1990 | Jolley |
| 4,938,887 A | 7/1990 | Grava |
| 4,941,986 A | 7/1990 | Jolley |
| 4,944,890 A | 7/1990 | Deeb |
| 4,948,525 A | 8/1990 | Sasaki |
| 4,959,169 A | 9/1990 | McGraw |
| 4,963,282 A | 10/1990 | Jolley |
| 4,971,712 A | 11/1990 | Gorski |
| 4,992,188 A | 2/1991 | Jolley |
| 5,008,028 A | 4/1991 | Jolley |
| 5,021,179 A | 6/1991 | Zehler |
| 5,021,180 A | 6/1991 | McGraw |
| 5,023,007 A | 6/1991 | Grava |
| 5,027,606 A | 7/1991 | Short |
| 5,032,305 A | 7/1991 | Kamakura |
| 5,032,306 A | 7/1991 | Cripps |
| 5,037,570 A | 8/1991 | Gorski |
| 5,053,155 A | 10/1991 | Mahler |
| 5,057,247 A | 10/1991 | Schmid |
| 5,061,550 A | 10/1991 | Shimizu |
| 5,080,816 A | 1/1992 | Sakamoto |
| 5,084,196 A | 1/1992 | Seiki |
| 5,096,606 A | 3/1992 | Hagihara |
| 5,137,650 A | 8/1992 | Kaneko |
| 5,158,698 A | 10/1992 | Jolley |
| 5,185,092 A | 2/1993 | Fukuda |
| 5,202,044 A | 4/1993 | Hagihara |
| 5,211,884 A | 5/1993 | Bunemann |
| 5,229,025 A | 7/1993 | Carter |
| 5,262,076 A | 11/1993 | Ishida |
| 5,273,410 A | 12/1993 | Kitaichi |
| 5,290,465 A | 3/1994 | Sabahi |
| 5,310,492 A | 5/1994 | Seiki |
| 5,354,486 A | 10/1994 | Evans |
| 5,391,313 A | 2/1995 | Antika |
| 5,403,503 A | 4/1995 | Seiki |
| 5,445,753 A | 8/1995 | Fukuda |
| 5,447,647 A | 9/1995 | Ishida |
| 5,486,302 A | 1/1996 | Short |
| 5,553,465 A | 9/1996 | Fukuda |
| 5,612,299 A | 3/1997 | Short |
| 5,711,165 A | 1/1998 | Iizuka |
| 5,833,876 A | 11/1998 | Schnur |
| 5,853,609 A | 12/1998 | Schnur |
| 5,906,769 A | 5/1999 | Schnur |
| 5,964,581 A | 10/1999 | Iizuka |
| 6,029,459 A | 2/2000 | Iizuka |
| 6,153,118 A | 11/2000 | Hasegawa |
| 6,183,662 B1 | 2/2001 | Schnur |
| 6,221,272 B1 | 4/2001 | Schnur |
| 6,258,293 B1 | 7/2001 | Iizuka |
| 6,267,906 B1 | 7/2001 | Schnur |
| 6,296,782 B1 | 10/2001 | Schnur |

FOREIGN PATENT DOCUMENTS

| | | |
|---|---|---|
| EP | 089 709 A1 | 9/1983 |
| EP | 195 110 | 9/1986 |
| EP | 227 477 A2 | 7/1987 |
| EP | 272 575 | 6/1988 |
| EP | 315 069 | 5/1989 |
| EP | 336 171 | 10/1989 |
| EP | 359 071 A1 | 3/1990 |
| EP | 377 122 A1 | 7/1990 |

| | | | | | |
|---|---|---|---|---|---|
| EP | 378 176 | 7/1990 | GB | 1460665 | 1/1977 |
| EP | 379 175 | 7/1990 | GB | 2216541 | 10/1989 |
| EP | 384 724 A1 | 8/1990 | JP | 53-136170 | 11/1978 |
| EP | 406 479 A1 | 1/1991 | JP | 54-040260 | 3/1979 |
| EP | 415 778 A1 | 3/1991 | JP | 55-145638 | 11/1980 |
| EP | 430 657 A1 | 6/1991 | JP | 55-155093 | 12/1980 |
| EP | 435 253 A1 | 7/1991 | JP | 56-036570 | 4/1981 |
| EP | 440 069 A1 | 8/1991 | JP | 56-131548 | 10/1981 |
| EP | 445 610 A1 | 9/1991 | JP | 56-133241 | 10/1981 |
| EP | 445 611 A1 | 9/1991 | JP | 57-078475 | 5/1982 |
| EP | 448 402 A2 | 9/1991 | JP | 58-015592 | 1/1983 |
| EP | 449 406 A1 | 10/1991 | JP | 59-021632 | 2/1984 |
| EP | 452 509 A1 | 10/1991 | JP | 59-027979 | 2/1984 |
| EP | 458 584 A1 | 11/1991 | JP | 59-029625 | 2/1984 |
| EP | 461 262 B1 | 12/1991 | JP | 61-062596 | 3/1986 |
| EP | 468 729 A1 | 1/1992 | JP | 61-181895 | 8/1986 |
| EP | 479 338 A2 | 4/1992 | JP | 62-000592 | 1/1987 |
| EP | 480 479 A2 | 4/1992 | JP | 62-290795 | 12/1987 |
| EP | 485 979 B1 | 5/1992 | JP | 01-259093 | 10/1989 |
| EP | 485 979 A2 | 5/1992 | JP | 01-259095 | 10/1989 |
| FR | 2.154.524 | 5/1973 | JP | 40-085396 | 3/1992 |
| FR | 2.302.290 | 9/1975 | RO | 96079 | 12/1988 |
| GB | 644597 | 10/1950 | SU | 208868 | 2/1968 |
| GB | 662650 | 12/1951 | SU | 1057526 | 11/1983 |
| GB | 760490 | 10/1956 | WO | WO 88/08023 | 10/1988 |
| GB | 889067 | 2/1962 | WO | WO 90/12849 | 11/1990 |
| GB | 892943 | 4/1962 | WO | WO 92/01030 | 1/1992 |
| GB | 894639 | 4/1962 | WO | WO 93/01249 | 1/1993 |
| GB | 1028402 | 5/1966 | WO | WO 93/11210 | 6/1993 |

POLYOL ESTER LUBRICANTS FOR HERMETICALLY SEALED REFRIGERATING COMPRESSORS

CROSS-REFERENCE TO RELATED APPLICATION

This application is a continuation of U.S. patent application Ser. No. 09/346,872 now abandoned, filed Jul. 2, 1999, which is a continuation of U.S. patent application Ser. No. 08/537,167, filed Sep. 29, 1995, now U.S. Pat. No. 6,221,272, issued Apr. 24, 2001, which is a continuation of U.S. patent application Ser. No. 08/268,879, filed Jun. 30, 1994, now abandoned, which is a continuation of U.S. patent application Ser. No. 08/027,628, filed Mar. 10, 1993, now abandoned, which is a continuation-in-part of International Patent Application No. PCT/US92/04438 filed Jun. 3, 1992, which designated the U.S.

BACKGROUND OF THE INVENTION

1. Field of the Invention

This invention relates to lubricant base stocks, which can also serve as complete lubricants in some cases; compounded lubricants, which include at least one additive for such purposes as improving high pressure resistance, corrosion inhibition, and the like along with the lubricant base stocks which contribute the primary lubricity to the compounded lubricants; refrigerant working fluids including lubricants according to the invention along with primary heat transfer fluids, and methods for using these materials. The lubricants and lubricant base stocks are generally suitable for use with most or all halocarbon refrigerants and are particularly suitable for use with substantially chlorine-free, fluoro-group-containing organic refrigerating heat transfer fluids such as pentafluoroethane, 1,1-difluoroethane, 1,1,1-trifluroethane, and tetrafluoroethanes, most particularly 1,1,1,2-tetrafluoroethane. The lubricants and base stocks, in combination with these heat transfer fluids, are particularly suitable for hermetically sealed compressors for domestic air conditioners and refrigerators, where long lubricant service lifetimes are important because of the difficulty and expense of supplying additional lubricant after the initial assembly of the compressor.

2. Statement of Related Art

Chlorine-free heat transfer fluids are desirable for use in refrigerant systems, because their escape into the atmosphere causes less damage to the environment than the currently most commonly used chlorofluorocarbon heat transfer fluids such as trichlorofluoromethane and dichlorodifluoromethane. The widespread commercial use of chlorine-free refrigerant heat transfer fluids has been hindered, however, by the lack of commercially adequate lubricants. This is particularly true for one of the most desirable working fluids, 1,1,1,2-tetrafluoroethane, commonly known in the art as "Refrigerant 134a" or simply "R134a". Other fluoro-substituted ethanes are also desirable working fluids.

Esters of hindered polyols, which are defined for this purpose as organic molecules containing at least five carbon atoms, at least 2-OH groups, and no hydrogen atoms on any carbon atom directly attached to a carbon atom bearing an —OH group, have already been recognized in the art as high quality lubricant basestocks for almost any type of refrigeration machinery employing a fluorocarbon refrigerant, particularly one free from chlorine. The following patents and published patent applications also teach many general classes and specific examples of polyol esters useful as refrigerant lubricants with chlorine-free fluoro group containing heat transfer fluids: U.S. Pat. No. 4,851,144; UK 2 216 541; U.S. Pat. Nos. 5,021,179; 5,096,606; WO 90/12849 (Lubrizol); EP 0 406 479 (Kyodo Oil); EP 0 430 657 (Asahi Denka KK); EP 0 435 253 (Nippon Oil); EP 0 445 610 and 0 445 611 (Hoechst AG); EP 0449 406; EP 0 458 584 (Unichema Chemie BV); and EP 0 485 979 (Hitachi).

DESCRIPTION OF THE INVENTION

Except in the claims and the operating examples, or where otherwise expressly indicated, all numerical quantities in this description indicating amounts of material or conditions of reaction and/or use are to be understood as modified by the term "about" in defining the broadest scope of the invention. Practice of the invention within the boundaries corresponding to the exact quantities stated is usually preferable, however.

More specifically, esters according to this invention should have a viscosity of not more than 44, or with increasing preference in the order given, not more than 42, 40, 38.5, 37.2, 36.6, 36.2, 35.7, or 35.2, centistokes at 40° C. Independently, esters according to this invention should have a viscosity of at least 22.5, or with increasing preference in the order given, at least 23.9, 25.0, 25.9, 26.7, 27.4, 28.0, 28.5, 29.0, 29.4, or 29.8, centistokes at 40° C.

It has now been found that selected polyol esters provide high quality lubrication for this kind of service. Specifically effective are esters or mixtures of esters made by reacting (i) a mixture of alcohol molecules selected from the group consisting of 2,2-dimethylol-1-butanol (also known as "trimethylolpropane" and often abbreviated hereinafter as "TMP"); di-trimethylolpropane (often abbreviated hereinafter as "DTMP"), a molecule with four hydroxyl groups and one ether linkage, formally derived from two molecules of TMP by removing one hydroxyl group from one of the TMP molecules and one hydrogen atom from a hydroxyl group of the other TMP molecule to form water and join the two remainders of the original TMP molecules with an ether bond; 2,2-dimethylol-1,3-propanediol (also known as "pentaerythritol" and often abbreviated hereinafter as "PE"); and di-pentaerythritol (often abbreviated hereinafter as "DPE"), a molecule with six hydroxyl groups and one ether bond, formally derived from two PE molecules by the same elimination of the elements of water as described above for DTMP, with (ii) a mixture of acid molecules selected from the group consisting of all the straight and branched chain monobasic and dibasic carboxylic acids with from four to twelve carbon atoms each, with the alcohol moieties and acyl groups in the mixture of esters selected subject to the constraints that (a) a total of at least 3%, or, with increasing preference in the order given, at least 7, 10, 14, 16, or 19%, of the acyl groups in the mixture 2-methylbutanoyl or 3-methylbutanoyl groups, which are jointly abbreviated hereinafter as "acyl groups from i-$C_5$ acid"; (b) the ratio of the % of acyl groups in the mixture that contain 8 or more carbon atoms and are unbranched to the % of acyl groups in the mixture that are both branched and contain not more than six, preferably not more than five, carbon atoms is not greater than 1.56, more preferably not greater than 1.21, or still more preferably not greater than 1.00; (c) the % of acyl groups in the ester mixture that contain at least nine carbon atoms, whether branched or not, is not greater than 81, or increasingly more preferably, not greater than 67 or 49; and (d) not more than 2, more preferably not more than 1, or still more preferably not more than 0.4, % of the acyl groups in the ester mixture are from acid molecules with more than two carboxyl groups each; and either (d)(1) a total of at least 20, or, with increasing preference in the order given, at least 29, 35, or 41% of the acyl groups in the mixture are from one of the trimethylhexanoic acids, most preferably from 3,5,5-trimethylhexanoic acid; and not more than 7.5, or, with increasing preference in the order given, not more than 6.0, 4.5, 3.0, 1.7, 0.9, or 0.4% of the acyl groups in the acid mixture are from dibasic acids; or (d)(2) at least 2.0, or with increasing preference in the order given, at least 2.8, 3.6, 4.1, or 4.9, %, but not more than 13%, preferably not more than 10%, or still more preferably not more than 7.0%, of the acyl groups in the ester mixture are from dibasic acid molecules; and a total of at least 82, or with increasing preference in the order given, at least 85, 89, 93, 96, or 99% of the monobasic acyl groups in the acid mixture have either five or six, or more preferably exactly five, carbon atoms each. In all these percentages, acyl groups are counted as a single group, irrespective of the number of valences they have. For example, each molecule of adipic acid yields a single, dibasic, acyl group when completely esterified.

(Of course, for all the types of esters described herein as part of the invention, it is possible to obtain the same esters or mixture of esters by reacting acid derivatives such as acid anhydrides, acyl chlorides, and esters of the acids with lower molecular weight alcohols than those desired in the ester products according to this invention, instead of reacting the acids themselves. The acids are generally preferred for economy and are normally specified herein, but it is to be understood that the esters defined herein by reaction with acids can be equally well obtained by reaction of alcohols with the corresponding acid derivatives, or even by other reactions. The only, critical feature is the mixture of acyl groups and alcohol moieties in the final mixture of esters formed.)

Preferably, with increasing preference in the order given, at least 60, 75, 85, 90, 95, or 98% of the hydroxyl groups in the mixture of alcohols reacted to make esters according to this invention are moieties of PE molecules. Independently, in the mixtures reacted to make the esters according to this invention, with increasing preference in the order given, at least 60, 75, 85, 90, 95, or 98% of the monobasic acid molecules in the acid mixture consist of molecules having no more than ten carbon atoms each and, with increasing preference in the order given, at least 60, 75, 85, 90, 95, or 98% of the dibasic acid molecules in the acid mixture consist of molecules having no more than ten carbon atoms each, or more preferably from five to seven carbon atoms each. Most preferably, with increasing preference in the order given, at least 60, 75, 85, 90, 95, or 98% of the monobasic acid molecules in the acid mixture consist of molecules having either five or nine carbon atoms each.

These preferences for the acyl groups and alcohol moieties in esters according to this invention are based on empirically determined generalizations. In order to achieve the desired middle range of viscosity, corresponding approximately to ISO grades 22–46, it is advantageous to have a substantial fraction of alcohols with at least four hydroxyl groups. Among the commercially available hindered alcohols that satisfy this criterion, PE is less expensive than DTMP and is free from the ether linkage in DTMP, which increases the hygroscopicity of the esters formed and thereby may promote undesirable corrosion of the metal surfaces lubricated. Alcohols with more than four hydroxyl groups produce esters with higher than optimum viscosities, but some such esters can be tolerated, and mixtures including them may be cheaper. Commercial grade PE often contains a substantial amount of DPE, and costs at least a little less than more purified PE. When cost factors are not severely constraining, removing most or all of the DPE from a predominantly PE mixture of alcohols used to make the esters is preferable, in order to minimize the chance of insolubility of part of the ester mixture at low temperatures.

In order to obtain esters with adequate viscosity, a considerable fraction of the acid molecules reacted need to have eight or more carbon atoms or be dibasic. Dibasic acids are less desirable. They must be used, if at all, in rather small amounts in order to avoid excessive viscosity, because of the capability of forming very high molecular weight and very viscous oligomers or polymers by reaction between alcohol and acid molecules that both have at least two functional groups. In practice, it has been found that the amount of dibasic acid that can be effectively used in the acid mixture reacted to make esters according to this invention is substantially less than the amount that would be sufficient to provide at least one dibasic acid group to link each two alcohol molecules in the alcohol mixture also reacted. Therefore, when such amounts of dibasic acid are used, some of the alcohol molecules will be joined together in the esters formed and some will not; the esters with two or more alcohol moieties will be much more viscous and normally less readily soluble in the fluorocarbon refrigerant fluids than the other esters in the mixture, those with only one alcohol moiety, thereby increasing the risk of undesirable phase separation in the course of use of the esters. However, limited amounts of dibasic acid may nevertheless be used, as already noted above.

When substantially only monobasic acids are used to make the esters, as already noted, in order to obtain adequate viscosity in the mixture, a substantial fraction of the acid molecules must have at least eight carbon atoms. With acids of such length, solubility in the fluorocarbon refrigerant fluids is less than for esters with shorter acids, and this reduced solubility is particularly marked for straight chain acids, so that a substantial fraction of the longer acids normally needs to be branched; alternatively, it has been found that these longer straight chain acids can be "balanced" for solubility with an equal or not too much less than equal fraction of branched acids with five or six carbon atoms. When the number of carbon atoms per molecule is nine or more, not even branching is sufficient to produce adequate solubility by itself, so that an upper limit on the fraction of such acids is independently required. In general, a minimum amount of the particularly advantageous i-$C_5$ acid is specified to aid in solubilizing the parts of the esters in the mixture that contain dibasic acids or those with eight or more carbon atoms.

For both performance and economic reasons, it has been found that five and nine carbon monobasic acids are the most preferred constituents, and they are very effective in balancing each other to achieve a mix of viscosity and solubility characteristics that is better suited than others to most applications. Trimethylhexanoic acids, with their three methyl branches, produce the most soluble esters among the readily available nine carbon acids. (In general, methyl branches are the most effective in promoting solubility without increasing viscosity excessively, because of the larger number of carbon atoms in other branching groups.) Branches on the carbon alpha to the carboxyl increase the difficulty of esterification and do not appear to be any more effective in increasing solubility than more remotely located branches. The most economical commercially available mixture of branched nine carbon acids, which contains from 88–95 mole % of 3,5,5-trimethylhexanoic acid with all but at most 1 mole % of the remainder being other branched $C_9$ monobasic acids, appears at least as effective as any other and is therefore preferred for economic reasons as the source of $C_9$ monobasic acids.

It is to be understood that only the desired alcohols and acids are explicitly specified, but some amount of the sort of impurities normally present in commercial or industrial grade products can be tolerated in most cases. For example, commercial pentaerythritol normally contains only about 85–90 mole % of pure pentaerythritol, along with 10–15 mole t of di-pentaerythritol, and commercial pentaerythritol is satisfactory for use in making lubricant esters according to this invention in many cases. In general, however, it is preferred, with increasing preference in the order given, that not more than 25, 21, 17, 12, 8, 5, 3, 2, 1, 0.5, or 0.2% of either the hydroxyl groups in the alcohol mixtures specified herein or of the carboxyl groups in the acid mixtures specified herein should be part of any molecules other than those explicitly specified for each type of lubricant base stock. Percentages of specific chemical molecules or moieties specified herein, such as the percentages of carboxyl and hydroxyl groups stated in the preceding sentence, are to be understood as number percentages, which will be mathematically identical to percentages by chemical equivalents, with Avogadro's number of each specified chemical moiety regarded as a single chemical equivalent.

The above descriptions for each of the acid and alcohol mixtures reacted to produce lubricant esters according to this invention refers only to the mixture of acids or alcohols that actually reacts to form esters and does not necessarily imply that the mixtures of acids or alcohols contacted with each other for the purpose of reaction will have the same composition as the mixture that actually reacts. In fact, it has been found that reaction between the alcohol(s) and the acid(s) used proceeds more effectively if the quantity of acid charged to the reaction mixture initially is enough to provide an excess of 10–25% of equivalents of acid over the equivalents of alcohol reacted with the acid. (An equivalent of acid is defined for the purposes of this specification as the amount containing one gram equivalent weight of carboxyl groups, while an equivalent of alcohol is the amount containing one gram equivalent weight of hydroxyl groups.) The composition of the mixture of acids that actually reacted can be determined by analysis of the product ester mixture for its acyl group content.

In making most or all of the esters and mixtures of esters preferred according to this invention, the acid(s) reacted will be lower boiling than the alcohol(s) reacted and the product ester(s). When this condition obtains, it is preferred to remove the bulk of any excess acid remaining at the end of the esterification reaction by distillation, most preferably at a low pressure such as 1–5 torr.

After such vacuum distillation, the product is often ready for use as a lubricant or lubricant base stock according to this invention. If further refinement of the product is desired, the content of free acid in the product after the first vacuum distillation may be further reduced by treatment with epoxy esters as taught in U.S. Pat. No. 3,485,754 or by neutralization with any suitable alkaline material such as lime, alkali metal hydroxide, or alkali metal carbonates. If treatment with epoxy esters is used, excess epoxy ester may be removed by a second distillation under very low pressure, while the products of reaction between the epoxy ester and residual acid may be left behind in the product without harm. If neutralization with alkali is used as the refinement method, subsequent washing with water, to remove any unreacted excess alkali and the small amount of soap formed from the excess fatty acid neutralized by the alkali, is strongly preferred before using the product as a lubricant and/or base stock according to this invention.

Under some conditions of use, the ester(s) as described herein will function satisfactorily as complete lubricants. It is generally preferable, however, for a complete lubricant to contain other materials generally denoted in the art as additives, such as oxidation resistance and thermal stability improvers, corrosion inhibitors, metal deactivators, lubricity additives, viscosity index improvers, pour and/or floc point depressants, detergents, dispersants, antifoaming agents, anti-wear agents, and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total compounded lubricant formulation.

An effective amount of the foregoing additive types is generally in the range from 0.01 to 5% for the anti-oxidant component, 0.01 to 5% for the corrosion inhibitor component, from 0.001 to 0.5% for the metal deactivator component, from 0.5 to 5% for the lubricity additives, from 0.01 to 2% for each of the viscosity index improvers and pour and/or floc point depressants, from 0.1 to 5% for each of the detergents and dispersants, from 0.001 to 0.1% for anti-foam agents, and from 0.1–2% for each of the anti-wear and extreme pressure resistance components. All these percentages are by weight and are based on the total lubricant composition. It is to be understood that more or less than the stated amounts of additives may be more suitable to particular circumstances, and that a single molecular type or a mixture of types may be used for each type of additive component. Also, the examples listed below are intended to be merely illustrative and not limiting, except as described in the appended claims.

Examples of suitable oxidation resistance and thermal stability improvers are diphenyl-, dinaphthyl-, and phenylnaphthyl-amines, in which the phenyl and naphthyl groups can be substituted, e.g., N,N'-diphenyl phenylenediamine, p-octyldiphenylamine, p,p-dioctyldiphenylamine, N-phenyl-1-naphthyl amine, N-phenyl-2-naphthyl amine, N-(p-dodecyl)phenyl-2-naphthyl amine, di-1-naphthylamine, and di-2-naphthylamine; phenothazines such as N-alkylphenothiazines; imino(bisbenzyl); and hindered phenols such as 6-(t-butyl) phenol, 2,6-di-(t-butyl) phenol, 4-methyl-2,6-di-(t-butyl) phenol, 4,4'-methylenebis(-2,6-di-{t-butyl}phenol), and the like.

Examples of suitable cuprous metal deactivators are imidazole, benzamidazole, 2-mercaptobenzthiazole, 2,5-dimercaptothiadiazole, salicylidine-propylenediamine, pyrazole, benzotriazole, tolutriazole, 2-methylbenzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan monooleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index improvers include polymethacrylates, copolymers of vinyl pyrrolidone and methacrylates, polybutenes, and styrene-acrylate copolymers.

Examples of suitable pour point and/or floc point depressants include polymethacrylates such as methacrylateethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable anti-foam agents include silicone polymers and some acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

Under some conditions of operation, it is believed that the presence in lubricants of the types of polyether polyols that have been prominent constituents of most prior art lubricant base stocks taught as useful with fluorocarbon refrigerant working fluids are less than optimally stable and/or inadequately compatible with some of the most useful lubricant additives. Thus, in one embodiment of this invention, it is preferred that the lubricant base stocks and lubricants be substantially free of such polyether polyols. By "substantially free", it is meant that the compositions contain no more than about 10% by weight, preferably no more than about 2.6% by weight, and more preferably no more than about 1.2% by weight of the materials noted.

One major embodiment of the present invention is a refrigerant working fluid comprising both a suitable heat transfer fluid such as a fluorocarbon and a lubricant according to this invention. Preferably, the refrigerant working fluid and the lubricant should have chemical characteristics and be present in such a proportion to each other that the working fluid remains homogeneous, i.e., free from visually detectable phase separations or turbidity, over the entire range of working temperatures to which the working fluid is exposed during operation of a refrigeration system in which the working fluid is used. This working range may vary from −60° C. to as much as +175° C. It is often adequate if the working fluid remains single phase up to +30° C., although it is increasingly more preferable if the single phase behavior is maintained up to 40, 56, 71, 88, or 100° C. Similarly, it is often adequate if the working fluid compositions remains a single phase when chilled to 0° C., although it is increasingly more preferable if the single phase behavior persists to −10, −20, −30, −40, or −55° C. Single phase mixtures with chlorine free hydrofluorocarbon refrigerant working fluids are usually obtained with the suitable and preferred types of esters described above.

Inasmuch as it is often difficult to predict exactly how much lubricant will be mixed with the heat transfer fluid to form a working fluid, it is most preferable if the lubricant composition forms a single phase in all proportions with the heat transfer fluid over the temperature ranges noted above. This however, is a very stringent requirement, and it is often sufficient if there is single phase behavior over the entire temperature range for a working fluid mixture containing up to 1% by weight of lubricant according to this invention. Single phase behavior over a temperature range for mixtures containing up to 2, 4, 10, and 15% by weight of lubricant is successively more preferable.

In some cases, single phase behavior is not required. The term "miscible" is used in the refrigeration lubrication art and hereinafter, except when part of the phrase "miscible in all proportions", when two phases are formed but are readily capable of being mixed into a uniform dispersion that remains stable as long as it is at least moderately agitated mechanically. Some refrigeration (and other) compressors are designed to operate satisfactorily with such miscible mixtures of refrigerant working fluid and lubricant. In contrast, mixtures that lead to coagulation or significant thickening and form two or more phases are unacceptable commercially and are designated herein as "immiscible". Any such mixture described below is a comparative example and not an embodiment of the present invention.

Another major embodiment of the invention is the use of a lubricant according to the invention, either as total lubricant or lubricant base stock, in a process of operating refrigerating machinery in such a manner that the lubricant is in contact with the refrigerant working fluid.

The practice of the invention may be further understood and appreciated by consideration of the following examples and comparative examples.

General Ester Synthesis Procedure

The alcohol(s) and acid(s) to be reacted, together with a suitable catalyst such as dibutyltin diacetate, tin oxalate, phosphoric acid, and/or tetrabutyl titanate, were charged into a round bottomed flask equipped with a stirrer, thermometer, nitrogen sparging means, condenser, and a recycle trap. Acid(s) were charged in about a 15% molar excess over the alcohol(s). The amount of catalyst was from 0.02 to 0.1% by weight of the weight of the total acid(s) and alcohol(s) reacted.

The reaction mixture was heated to a temperature between about 220 and 230° C., and water from the resulting reaction was collected in the trap while refluxing acids were returned to the reaction mixture. Partial vacuum was maintained above the reaction mixture as necessary to achieve a reflux rate of between 8 and 12% of the original reaction mixture volume per hour.

The reaction mixture was sampled occasionally for determination of hydroxyl number, and after the hydroxyl number had fallen below 5.0 mg of KOH per gram of mixture, the majority of the excess acid was removed by distillation after applying the highest vacuum obtainable with the apparatus used, corresponding to a residual pressure of about 0.05 torr, while maintaining the reaction temperature. The reaction mixture was then cooled, and any residual acidity was removed, if desired, by treatment with lime, sodium hydroxide, or epoxy esters. The resulting lubricant or lubricant base stock was dried and filtered before phase compatibility testing.

General Procedure for Phase Compatibility Testing

One milliliter ("ml") of the lubricant to be tested is placed into a thermal shock resistant, volumetrically graduated glass test tube 17 millimeters ("mm") in diameter and 145 mm long. The test tube is then stoppered and placed into a cooling bath regulated to −29±0.2° C. After the tube and contents have equilibrated in the cooling bath for 5 minutes ("min"), sufficient refrigerant working fluid is added to give a total volume of 10 ml.

At least 15 min after the working fluid has been added, during which time the tube and contents have been equilibrating in the cooling bath and the contents may have been agitated if desired, the tube contents are visually examined for evidence of phase separation. If there is any such phase separation, the tube is shaken to determine whether the combination can be rated as miscible or is totally unacceptable.

If there is no evidence of phase separation at −29° C., the temperature of the cooling bath is usually lowered at a rate of 0.3° per min until phase separation is observed. The temperature of first observation of phase separation, if within the range of the cooling equipment used, is then noted as the insolubility onset temperature.

Composition of Specific Examples

A suitable ester mixture as described above was prepared by reacting a mixture of alcohol molecules in which 99.4% were PE molecules, with most of the remainder being DPE molecules, with a mixture of acid molecules that included 46.7% of pentanoic (=n-valeric) acid, 21.5% of 2-methylbutanoic acid, and 31.6% of 3,5,5-trimethylhexanoic acid, with the remainder predominantly other branched $C_9$ monobasic acids. This ester mixture had an ISO grade of 32.

A second suitable ester mixture as described above was prepared by reacting a mixture of alcohol molecules in which 99.4% were PE molecules, with most of the remainder being DPE molecules, with a mixture of acid molecules that included 66.8% of pentanoic (=n-valeric) acid, 28.4% of 2-methylbutanoic acid, and 4.6% of adipic acid, with the remainder being predominantly 3-methylbutanoic acid. This lubricant base stock had an ISO grade of 32.

The invention claimed is:

1. A refrigerant working fluid consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., remaining in a single phase with the heat transfer fluid between about −40° C. and about +71° C. and consisting essentially of a mixture of polyol ester molecules in which at least about 92% of the alcohol moieties are selected from the group consisting of the alcohol moieties derived from TMP, DTMP, PE and DPE and in which only monobasic acids are used to make the ester, said monobasic acid groups being further selected subject to the constraints that (a) the % of monobasic acid groups in the mixture that contain at least nine carbon atoms whether branched or not is not greater than about 67; (b) a total of at least about 20% of the monobasic acid groups in the mixture are from one of the trimethylhexanoic acids and (c) at least about 60% carbon atoms of the monobasic acid groups in the acid mixture consist of molecules having either five or nine carbon atoms each.

2. A refrigerant working fluid consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., remaining in a single phase with the heat transfer fluid between about −40° C. and about +71° C. and consisting essentially of a mixture of polyol ester molecules in which at least about 92% of the alcohol moieties are selected from the group consisting of the alcohol moieties derived from TMP, DTMP, PE and DPE, at least about 60% of the hydroxyl groups in the mixture of alcohol moieties are moieties of PE molecules and in which only monobasic acids are used to make the ester, said monobasic acid groups being further selected subject to the constraints that (a) the % of monobasic acid groups in the mixture that contain at least nine carbon atoms whether branched or not is not greater than about 67; (b) a total of at least about 20% of the monobasic acid groups in the mixture are from one of the trimethylhexanoic acids and (c) at least about 60% of the monobasic acid groups in the acid mixture consist of molecules having either five or nine carbon atoms each.

3. The refrigerant working fluid according to claim 2 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., and remaining in a single phase with the heat transfer fluid between about −40° C. and about +71° C. and consisting essentially of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said monobasic acid groups being further selected subject to the constraints that (a) the % of monobasic acid groups in the mixture that contain at least nine carbon atoms whether branched or not is not greater than about 67; (b) a total of at least about 20% of the monobasic acid groups in the mixture are from one of the trimethylhexanoic acids and (c) at least about 60% of the monobasic acid groups in the acid mixture consist of molecules having either five or nine carbon atoms each.

4. The refrigerant working fluid according to claim 2 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., remaining in a single phase with the heat transfer fluid between about −55° C. and about +71° C. and consisting essentially of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said acyl groups being further selected subject to the constraints that (a) the % of the monobasic acid groups in the mixture that contain at least nine carbon atoms whether branched or not is not greater than about 67;

(b) a total of at least about 29% of the monobasic acid groups in the mixture are from one of the trimethylhexanoic acids and (c) at least about 90% of the monobasic acid groups in the acid mixture consist of molecules having either five or nine carbon atoms each.

5. The refrigerant working fluid according to claim 2 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 26.7 and about 40 centistokes at 40° C., remaining in a single phase with the heat transfer fluid between about −55° C. and about +71° C. and consisting essentially of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said acyl groups being further selected subject to the constraints that (a) the % of monobasic acid groups in the mixture that contain at least nine carbon atoms whether branched or not is not greater than about 67; (b) a total of at least about 29% of the monobasic acid groups in the mixture are from one of the trimethylhexanoic acids and (c) at least about 95% of the monobasic acid groups in the acid mixture consist of molecules having either five or nine carbon atoms each.

6. The refrigerant working fluid according to claim 2 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 28.5 and about 35.2 centistokes at 40° C., remaining in a single phase with the heat transfer fluid between about −55° C. and about +71° C. and consisting essentially of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said monobasic acid groups being further selected subject to the constraints that (a) the % of the monobasic acid groups in the mixture that contain at least nine carbon atoms whether branched or not is not greater than about 49; (b) a total of at least about 29% of the monobasic acid groups in the mixture are from one of the trimethylhexanol acids and (c) at least about 98% of the acyl groups in the acid mixture consist of molecules having either five or nine carbon atoms each.

7. The refrigerant working fluid consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., remaining in a single phase with the heat transfer fluid between about −40° C. and about +71° C. and consisting essentially of A) at least about 92% by weight of a mixture of polyol ester molecules in which at least about 92% of the alcohol moieties are selected from the group consisting of the alcohol moieties derived from TMP, DTMP, PE and DPE and in which only monobasic acids are used to make the ester, said monobasic acid groups being further selected subject to the constraints that (a) the % of the monobasic acid groups in the mixture that contain at least nine carbon atoms whether branched or not is not greater than about 67; (b) a total of at least about 20% of the monobasic acid groups in the mixture are from one of the trimethylhexanoic acids and (c) at least about 60% of the monobasic acid groups in the acid mixture consist of molecules having either five or nine carbon atoms each and B) up to about 8% by weight of one or more additives selected from the group consisting of oxidation resistance and thermal stability improvers, corrosion inhibitors, metal deactivators, lubricity additives, viscosity index improvers, pour and floc point depressants, detergents, dispersants, antifoaming agents, anti-wear agents and extreme pressure resistant additives.

8. The refrigerant working fluid according to claim 7 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., and remaining in a single phase with the heat transfer fluid between about −40° C. and about +71° C. and consisting essentially of A) at least about 92% by weight of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said monobasic acid groups being further selected subject to the constraints that (a) the % of the monobasic acid groups in the mixture that contain at least nine carbon atoms whether branched or not is not greater than about 67; (b) a total of at least about 20% of the monobasic acid groups in the mixture are from one of the trimethylhexanol acids and (c) at least about 90% of the monobasic acid groups in the acid mixture consist of molecules having either five or nine carbon atoms each and B) up to about 8% by weight of one or more additives selected from the group consisting of oxidation resistance and thermal stability improvers, corrosion inhibitors, metal deactivators, lubricity additives, viscosity index improvers, pour and floc point depressants, detergents, dispersants, antifoaming agents, anti-wear agents and extreme pressure resistant additives.

9. The refrigerant working fluid according to claim 7 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 22.5 and about 44 centistokes at 40° C., remaining in a single phase with the heat transfer fluid between about −55° C. and about +71° C. and consisting essentially of A) at least about 92% by weight of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said monobasic acid groups being further selected subject to the constraints that (a) the % of the monobasic acid groups in the mixture that contain at least nine carbon atoms whether branched or not is not greater than about 67; (b) a total of at least about 29% of the monobasic acid groups in the mixture are from one of the trimethylhexanoic acids and (c) at least about 95% of the monobasic acid groups in the acid mixture consist of molecules having either five or nine carbon atoms each and B) up to about 8% by weight of one or more additives selected from the group consisting of oxidation resistance and thermal stability improvers, corrosion inhibitors, metal deactivators, lubricity additives, viscosity index improvers, pour and floc point depressants, detergents, dispersants, antifoaming agents, anti-wear agents and extreme pressure resistant additives.

10. The refrigerant working fluid according to claim 7 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 26.7 and about 40 centistokes at 40° C., remaining in a single phase with the heat transfer fluid between about −55° C. and about +71° C. and consisting essentially of A) at least about 92% by weight of a mixture of polyol ester molecules in which at least about 92% of the alcohol moieties are selected from the group consisting of the alcohol moieties derived from TMP, DTMP, PE and DPE, at least about 85% of the hydroxyl groups in the mixture of alcohol moieties are moieties of PE molecules and in which only monobasic acids are used to make the ester, said monobasic acid groups being further selected subject to the constraints that (a) the % of the monobasic acid groups in the mixture that contain at least nine carbon atoms whether branched or not is not greater than about 67; (b) a total of at least about 35% of the monobasic acid groups in the mixture are from one of the trimethylhexanoic acids and (c) at least about 98% of the monobasic acid groups in the acid mixture consist of molecules having either five or nine carbon atoms each and B) up to about 8% by weight of one or more additives selected from the group consisting of oxidation resistance and thermal stability improvers, corrosion inhibitors, metal deactivators, lubricity additives, viscosity index improvers, pour and floc point depressants, detergents, dispersants, antifoaming agents, anti-wear agents and extreme pressure resistant additives.

11. The refrigerant working fluid according to claim 7 consisting essentially of a heat transfer fluid consisting of a substantially chlorine-free fluoro-group containing organic refrigerating heat transfer fluid and a composition of matter suitable for serving as a lubricant or lubricant base stock, said composition being a liquid with a viscosity between about 28.5 and about 35.2 centistokes at 40° C., remaining in a single phase with the heat transfer fluid between about −55° C. and about +71° C. and consisting essentially of A) at least about 92% by weight of a mixture of polyol ester molecules in which at least about 92% of the alcohol moieties are selected from the group consisting of the alcohol moieties derived from TMP, DTMP, PE and DPE, at least about 98% of the hydroxyl groups in the mixture of alcohol moieties are moieties of PE molecules and in which only monobasic acids are used to make the ester, said monobasic acid groups being further selected subject to the constraints (a) the % of the monobasic acid groups in the mixture that contain at least nine carbon atoms whether branched or not is not greater than about 49; (b) a total of at least about 41% of the monobasic acid groups in the mixture are from one of the trimethylhexanol acids and (c) at least about 98% of the monobasic acid groups in the acid mixture consist of molecules having either five or nine carbon atoms each and B) up to about 8% by weight of one or more additives selected from the group consisting of oxidation resistance and thermal stability improvers, corrosion inhibitors, metal deactivators, lubricity additives, viscosity index improvers, pour and floc point depressants, detergents, dispersants, antifoaming agents, anti-wear agents and extreme pressure resistant additives.

12. The refrigerant working fluid according to claim 1 wherein the chlorine-free fluoro-group containing organic refrigerating heat transfer fluid comprises at least one of pentafluoroethane, 1,1-difluoroethane, 1,1,1-trifluoroethane and tetrafluoroethane.

13. The refrigerant working fluid according to claim 12 wherein the chlorine-free fluoro-group containing organic refrigerating, heat transfer fluid is 1,1,1,2-tetrafluoroethane.

14. The refrigerant working fluid according to claim 2 wherein the chlorine-free fluoro-group containing organic refrigerating heat transfer fluid comprises at least one of pentafluoroethane, 1,1-difluoroethane, 1,1,1-trifluoroethane and tetrafluoroethane.

15. The refrigerant working fluid according to claim 3 wherein the chlorine-free fluoro-group containing organic refrigerating heat transfer fluid comprises at least one of pentafluoroethane, 1,1-difluoroethane, 1,1,1-trifluoroethane and tetrafluoroethane.

16. The refrigerant working fluid according to claim 4 wherein the chlorine-free fluoro-group containing organic refrigerating heat transfer fluid comprises at least one of pentafluoroethane, 1,1-difluoroethane, 1,1,1-trifluoroethane and tetrafluoroethane.

17. The refrigerant working fluid according to claim 7 wherein the chlorine-free fluoro-group containing organic refrigerating heat transfer fluid comprises at least one of pentafluoroethane, 1,1-difluoroethane, 1,1,1-trifluoroethane and tetrafluoroethane.

18. The refrigerant working fluid according to claim 17 wherein the chlorine-free fluoro-group containing organic refrigerating heat transfer fluid is 1,1,1,2-tetrafluoroethane.

19. A process for operating a refrigerator comprising cyclic compression, liquefaction, expansion, and evaporation of the refrigerant working fluid as claimed in claim 1.

20. A process for operating a refrigerator comprising cyclic compression, liquefaction, expansion, and evaporation of the refrigerant working fluid as claimed in claim 7.

* * * * *